July 18, 1967  H. L. HOUGH ET AL  3,331,956

SURFACE LEVEL RUNWAY LIGHTING UNIT

Filed Dec. 23, 1964  2 Sheets-Sheet 1

ROBERT E. LEVIN
HAROLD L. HOUGH
*INVENTORS*

BY *Lawrence Brown*
ATTORNEY

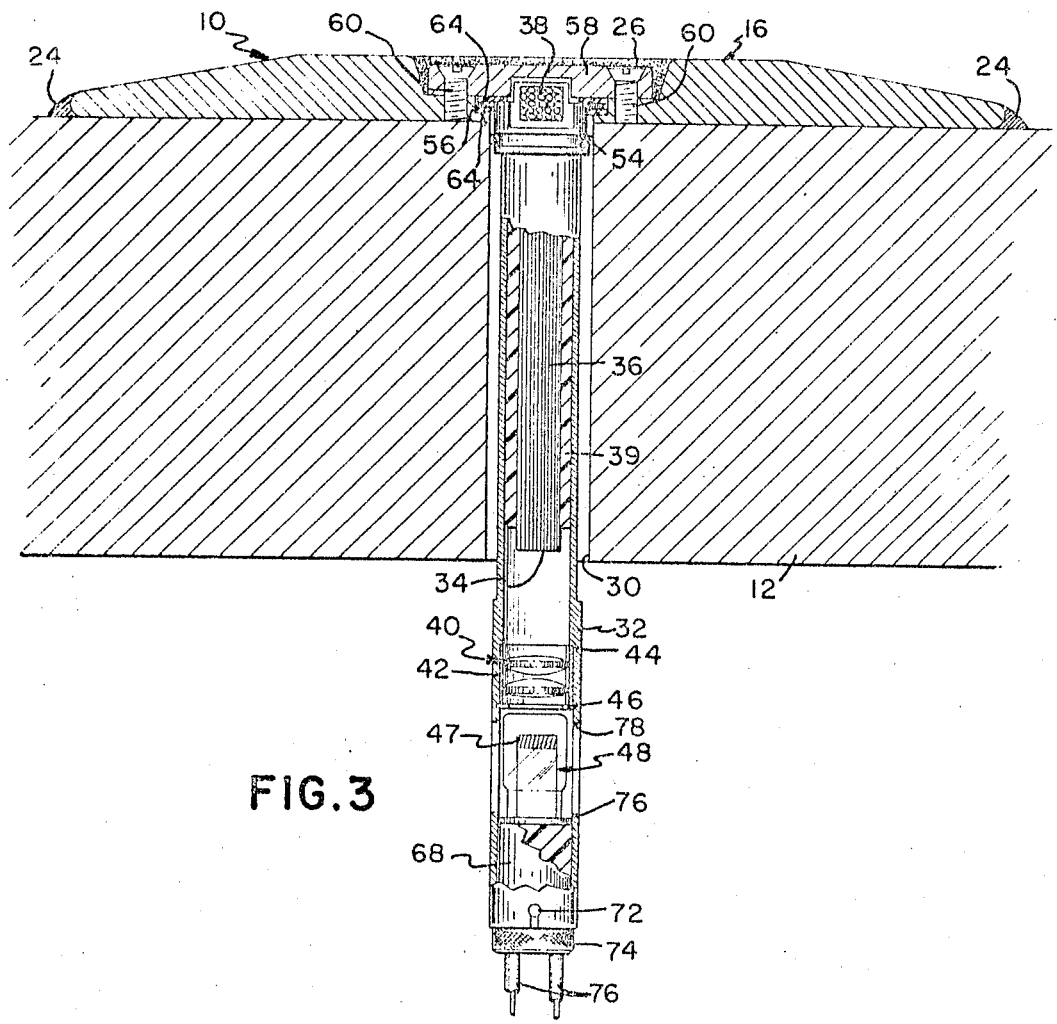

3,331,956
SURFACE LEVEL RUNWAY LIGHTING UNIT
Harold L. Hough, Beverly, and Robert E. Levin, Hamilton, Mass., assignors to Sylvania Electric Products, Inc., a corporation of Delaware
Filed Dec. 23, 1964, Ser. No. 420,519
5 Claims. (Cl. 240—1.2)

This invention relates to a lighting apparatus and more particularly, to aircraft landing approach guidance systems employing a plurality of light sources which produce patterns of continuously delineated pathways and boundaries during night and unfavorable conditions.

Present day aircraft has advanced to a degree where increased speed and heavy air traffic requires that landing be done in one approach, especially with naval aircraft carriers. However, we do not intend to limit the use of our present invention to naval landing systems, but due to the more intricate problems encountered in landing procedures of carrier type aircraft, our specific example will be directed to that of a lighting system used in conjunction with a landing deck.

Many problems have been encountered in recent years when faster jet type aircraft have replaced the slower propeller types. One of the most prominent obstacles encountered is the "black hole" effect. Earlier runway approach lighting systems consisted of an edgelight arrangement which utilized lighting units spaced along both sides of the runway, the rows of lights appeared to move upward and further apart. When flying between the rows and close to the ground, the edgelights could no longer be seen. This is referred to as the "black hole" effect. This condition becomes increasingly dangerous with the present day use of jet aircraft, for they not only land at higher speeds but are less stable just before touchdown. To eliminate this, a single centerline of spaced flushmounted lighting units are used. With this in mind, many variations in the design of flush-mounted deck lights have been attempted. The basic concept is that a small point source light is used and the fixtures are so arranged that they delineate a solid line for directional guidance when viewed at a distance even under limited visibility conditions.

When an aircraft approaches a carrier deck, certain other conditions have to be considered. All aircraft must use the same runway and land within a certain alloted time, therefore the deck must be cleared as quickly as possible to make room for the next aircraft preparing to land. Due to the speed of the aircraft and the abbreviated runway of a carrier deck, an aircraft has to be stopped after a short touchdown run. This is accomplished by a tail hook, located on the aircrafts tail which contacts a retarding wire stretched just above the landing surface of the carrier. As the aircraft makes contact with the deck and continues along the landing deck, the hook will ride on, or just above the deck surface, until such time as the hook contacts the retarding wire, thereafter the aircraft's forward progress will be terminated. This landing procedure has made the design of a deck light a very formidable challenge. If any part of the lamp housing can be engaged by the tail hook, it will literally rip the fixtures from the surface of the deck.

Another major problem that also has to be considered in designing equipment of this type is that the fixture and its optical components must be able to withstand an impact of about 40,000 pounds per square inch static load, such as exerted by a pneumatic tire of an aircraft upon initial impact of touchdown.

With the above considerations, the design of a deck light fixture should be held to a height of ¾ of an inch above the landing deck surface and the top must angle off to a gradual slope. The optical components and the fixture itself must also be able to withstand the constant initial shock of the landing aircraft. Moreover, they must be weatherproof and lamp replacement should be easy. Hence, a lamp or any other optical component should be readily accessible so that with a minimum of time and effort any one part or the complete optical system can be replaced.

In our present invention we have taken into consideration the above mentioned requirements in the design of a navy deck lighting fixture. Our fixture includes a circular-shaped, substantially flush housing, that can be welded directly to the steel runway deck of a carrier. The circular housing has a wedged slot, extending from its center, so that light may emerge from an optical window which is positioned in a central bore of the housing. The optical system includes a high intensity lamp that passes rays of light through a pair of condensing lenses to focus on an end window of an optical conduit. These components are packaged in a tubular metal casing which is held below the surface of the deck and positioned in the fixture to insure a shock and weather proof installation.

Therefore it is a general object of our invention to provide a substantially flush-mounted light fixture suitable for installation on a naval carrier deck, capable of producing a light beam of relatively high intensity, directed so as to clearly delineate an illuminated guideway for approaching aircraft.

A more specific object of the present invention is to provide a landing deck lighting fixture which is attached directly to the landing deck of a naval carrier and houses an optical system that is isolated from shock and the elements of weather.

A further object of our invention is to provide a lighting fixture for landing deck or strips that is substantially flush thereby preventing damage by landing aircraft using retarding equipment such as tail hooks.

Other objects and further features of the invention will be readily apparent from the following description and drawings in which.

Figure 1:
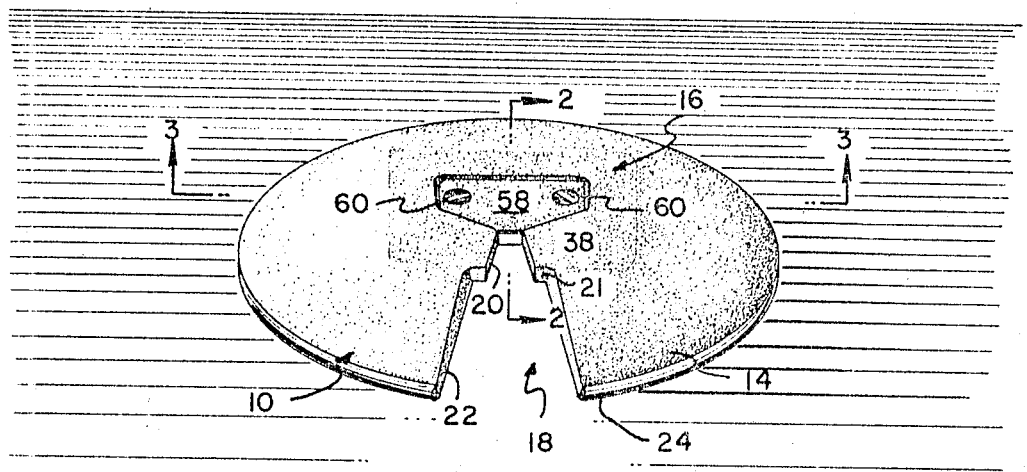
FIGURE 1 is a perspective view of the lighting fixture showing in particular the angle cutaway for the exit of light.

And FIGURE 3 is an enlarged cross-sectional view of FIG. 1 taken on the line 3—3 of FIG. 1, showing in particular the location of the various components of the optical system.

As shown in the figures of the drawing, the lighting fixture 10 of the present invention is particularly adapted to be almost flush with the landing surface, or in this specific example, a deck surface 12 of a naval carrier. The fixtures are spaced apart on the centerline of the landing strip to provide a delineated pathway of light. Each fixture includes a relatively flat circular cast metal housing 14, the central portion of which has a raised rectangular plateau 16 which designates the maximum height of the fixture. A stepped wedge-shaped slot 18 provides a clearance channel for light rays from the plateau 16 to be radial edge of the fixture. From the plateau area 16, the height of the fixture diminishes to a point where the radial edge of the fixture is left with just enough thickness to provide a lip for applying a weld 24 between the fixture and deck about the circumferential edge of the fixture.

Plateau 16 is provided with a substantially rectangular recessed area 26 having a centrally located main bore 28 and a larger counter bore 29. The main bore 28 is in co-operating relationship with a bore 30 provided in the deck 12.

The operational arrangement of the fixture 14 is such that the wedge slot 18 faces the approach of the runway and the bore 28 of the fixture is aligned with the bore 30 located in the deck. In this relative position the fixture is secured to the deck by applying a weld 24 about the radial edge of the fixture.

The optical system of the present invention is a separate unit and the individual components are housed in a metal tubing 32. One of the components of the optical system comprises an offset fiber optical rod 36, one end of which is bent at a right angle. This rod 36 may be considered to have two window surfaces; an entrance window at one end and an exit window at the opposite end. Rod 36 extends from approximately the middle of tube 32 where the entrance window 34 is located to a point just above the deck surface where the tube is bent at a right angle so as to define the exit window 38. Window 38 is located within the opening formed by the narrow part of the small wedge 20 and is rigidly encased and held in this position by a potting material 39 such as a silicone rubber. The potting material 39 not only holds the rod 36 in place but also provides a weather and shock resistant seal.

Located directly below the lower end of the optical fiber rod 36 and adequately spaced from the end thereof, are a pair of condensing lenses 40, separated from one another and rigidly held in a lens holder 42. The lens holder 42 is fitted into one optical tube 32 and abuts against a ridge 44 on the interior wall of the tube where a lock ring 46 accurately secures the lens holder a measured distance from the end of the optical rod 36. Spaced relatively below the condensing lenses 40 is a single ended quartz iodine lamp 48, such as described in co-pending application, entitled, "Single-Ended Quartz Type Incandescent Lamp," Ser. No. 374,750, filed June 12, 1964, and assigned to the assignee of the instant invention.

The filament 47 of the lamp 48 will produce a high intensity light that will be collected by the condensing lens 40 and project these intensive light rays on the entrance window 34 of the optical fiber rod 36. By accurately locating the condensing lens 40 with respect to the filament 47 of the lamp, and to the entrance window 34, a large solid angle of the light rays emitted by the filament 47 will be collected by the condensing lens 40 and compressed into the total area of the entrance window 34. An additional function of the condensing lenses 40 is to set the angular spread of the light beam emerging from the exit window 38. The light rays will then travel a path in the optically true fiber rod 36, following the right angle bend at a point above the deck surface and will pass out through the exit window 38 located at the vertex of the wedge slot 18, thus providing a high intensity light source projected out at deck surface.

As stated earlier, the optical system is a complete unit prime importance, especially due to the critical location of the fixtures. In our present invention we provide a simple and inexpensive replacement procedure for all of the sensitive optical components.

Figure 2:
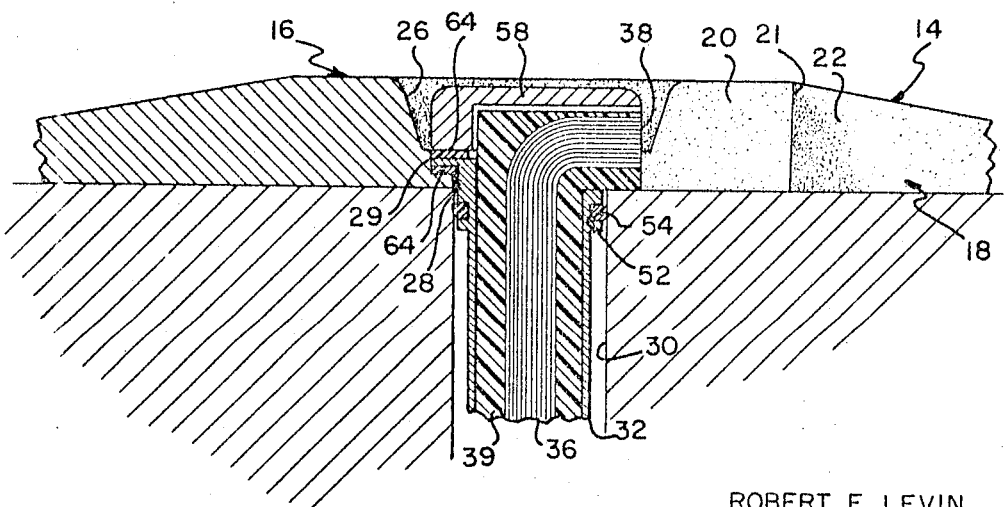
FIGURE 2 is an enlarged cross-sectional view of the fiber optical rod showing the sealing arrangement of the fixture taken on line 2—2 of FIG. 1.

As stated earlier, the optical system is a complete unit in itself, that is, the components are encased within the optical tube 32. As seen in FIGS. 2 and 3, the optical tube casing 32 has an enlarged diameter area at its upper end with a circular groove 52 positioned midway its length, for the adaptation of a gasket ring 54. The distal end of the tube 32 is provided with an enlarged circular lip 56, equal in diameter to the counter bore 29.

With the above described configuration of the tube casing, and as viewed in FIG. 3, the tube 32 can be inserted from above the deck 12, by removing a metal cover plate 58, the plate 58 is held in position by screws 60, and has a relieved area on the bottom side, for the adaption of the right angle bend portion of the optical rod 36. It can be mentioned at this time that the enlarged diameter and the circular lip 56 of the end of rod 36 and its exit window is placed just above the surface of deck 12.

A pair of rubber gaskets 64 are positioned on either side of the enlarged lip 56, therefore with the combination of the rubber gaskets 64 on either side of the lip 56, and the ring gasket 54 positioned in groove 52, the optical tube 32 can be inserted through bore 28 and into bore 30. The ring gasket will fit tightly against the inner wall of bore 30 and the rubber gaskets 64 positioned on either side of the lip 56 will seal the counter bore area 29.

The top cover plate 58 is then positioned in placed over the top of the bent portion of the encased fiber rod 36 and with the tightening of screws 60 the optical tube 32 will be firmly held in an aligned position relative to the exit window 38 fixed in the opening formed by the converging sides of wedge slot 20. It can be noted in FIGS. 2 and 3 that the top cover plate 58 is recessed from the plateau surface 16. The size of the recessed area 26 is such that a tail hook cannot engage the recessed cover plate 58 therefore protecting the optical components from damage by the arresting mechanism of the aircraft.

With the removal of the top cover plate 58, a readily accessible replacement of the optical system can be attained. However, when lamp replacement is necessary a simpler method can be followed, as viewed in FIG. 3, the lamp 48 is based in a tubular metal casing 68, the interior of which is filled with a potting material identical to that used in encasing the fiber optic rod 36, this will provide a resilient shockproof base for the lamp 48.

Located between the lamp envelope and the base is a metal ring 76 which encircles the upper part of the potted base, the ring 76 provides a reflective surface to prevent heat buildup at the base of the lamp 48, also a pair of oppositely disposed relief slots 78 are provided in the tube casing 32 adjacent the lamp envelope, these slots will also dissipate any excessive heat generated by lamp 48.

The base 68 of lamp 48 extends beyond the end of the metal casing 32 and is provided with a knurled circular flange 74 that abuts against the end of the tube 32. A pair of electrical supply wires 76 for lamp 48 extend through the knurled flange 74 to a distant power supply. The lamp base 68 has a tapped hole for the mating of a captive cap screw 72 which extends through outer casing 32. Therefore with removal of screw 72, the lamp can be withdrawn from the tube 32 and replaced if necessary, with no interruption in traffic on the upper portion of deck 12.

It is apparent that modifications and changes may be made within the spirit and scope of the instant invention, but it is our intention however, only to be limited by the appended claims.

What we claim is:

1. An aircraft runway lighting apparatus comprising: a lamp housing, said housing having a central plateau, the height of said housing diminishing from said plateau to the outer edges; an optical system disposed within a tubular casing located below said central plateau, said system comprising a lamp, a condensing lens means and a unitary curved optical conduit held within the confines of a receptacle, said curved optical conduit having an exit window being disposed outside of said receptacle, said condensing lens means being positioned between said lamp and entrance window of said curved optical conduit, said lamp potted in a removable plug fitted to the lower end of said tubular casing, whereby light rays from said lamp will be gathered, condensed and projected through said entrance window of said optical conduit and carried over an angled path to emerge from said exit window; means to allow the emergence of light from said exit window, said means being positioned in said central plateau and extending outwardly on said housing.

2. An aircraft runway lighting apparatus comprising: a lamp housing, said housing having a central plateau, the height of said housing diminishing from said plateau to the outer edges; an optical system disposed within a tubular casing located below said central plateau, said system comprising a lamp, a condensing lens means and a unitary curved optical conduit held within the confines of a receptacle, said curved optical conduit having an exit window being disposed outside of said receptacle, said condensing lens means being positioned between said lamp and entrance window of said curved optical conduit, said lamp potted in a removable plug fitted to the lower end of said tubular casing, whereby light rays from said lamp will be gathered, condensed and projected to said entrance window of said optical conduit and carried over an angled path to emerge from said exit window; said exit window being positioned at the apex of a wedged-shaped relief slot extending from said central plateau to the outer edge of said housing for the clearance of light rays from said exit window of said optical conduit.

3. An aircraft runway lighting apparatus comprising: a lamp housing, said housing have a central plateau, provided with a wedged-shaped relief slot, the height of said housing diminishing from said plateau to the outer edges; an optical system disposed within a tubular casing located below said central plateau, said system comprising a single ended high intensity lamp potted in a removable plug and fitted to the lower end of said tubular casing, a plurality of condensing lenses and a curved optical conduit held within the confines of a receptacle; a resilient potting material disposed about said curved optical conduit, said curved optical conduit having an entrance and exit window, said exit window being disposed outside of said receptacle; said condensing lens means being positioned between said lamp and said entrance window of said curved optical conduit whereby light rays from said lamp will be gathered, condensed and projected through said entrance window of said optical conduit to emerge from said exit window located at the apex of said wedged-shaped relief slot, said slot provided for the clearance of light rays projected from said lamp.

4. An aircraft runway lighting apparatus comprising: a lamp housing, said housing having a central plateau provided with a wedged-shaped relief slot the height of said housing diminishing from said plateau to the outer edges; an optical system disposed within a tubular casing located below central plateau, said system comprising a single ended high intensity lamp potted in a removable plug and fitted to the lower end of said tubular casing, a plurality of condensing lens and a curved optical conduit held within the confines of a receptacle; a resilient potting material disposed about said curved optical conduit, said curved optical conduit having an entrance and exit window, said exit window being disposed outside of said receptacle; said condensing lens means being positioned between said lamp and said entrance window of said curved optical conduit, whereby light rays from said lamp will be gathered, condensed and projected through said entrance window of said optical conduit to emerge from said exit window located at the apex of said wedged-shaped relief slot, provided for the clearance of light rays projected from said lamp.

5. A lighting apparatus comprising: a lamp housing, said housing having a central plateau provided with a wedged-shaped relief slot, the height of said housing diminishing from said plateau to the outer edges; an optical system disposed within a tubular casing located below said central plateau, said system comprising a single ended high intensity lamp potted in a removable plug and fitted to the lower end of said tubular casing, a plurality of condensing lens and a curved optical conduit held within the confines of a receptacle; a resilient potting material disposed about said curved optical conduit, said curved optical conduit having an entrance and exit window, said exit window being disposed outside of said receptacle; said condensing lens means being positioned between said lamp and said entrance window of said curved optical conduit, whereby light rays from said lamp will be gathered, condensed and projected through said entrance window of said optical conduit to emerge from said exit window located at the apex of said wedged-shaped relief slot, provided for the clearance of light rays projected from said lamp.

References Cited

UNITED STATES PATENTS

| 3,007,034 | 10/1961 | Reed et al. | 240—1.2 |
| 3,016,785 | 1/1962 | Kapany | 240—1 |
| 3,250,906 | 5/1966 | Loch | 240—1.2 |

FOREIGN PATENTS

| 730,227 | 5/1955 | Great Britain. |

NORTON ANSHER, *Primary Examiner.*

W. M. FRYE, *Assistant Examiner.*